United States Patent [19]
Mathers et al.

[11] Patent Number: 6,012,145
[45] Date of Patent: *Jan. 4, 2000

[54] SECURITY SYSTEM FOR HARD DISK DRIVE

[75] Inventors: Stewart Mathers, Ayr; Alec Donald Stewart, Fife, both of United Kingdom

[73] Assignee: Calluna Technology Limited, Edinburgh, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/640,919
[22] PCT Filed: Nov. 14, 1994
[86] PCT No.: PCT/GB94/02508
  § 371 Date: Jul. 10, 1996
  § 102(e) Date: Jul. 10, 1996
[87] PCT Pub. No.: WO95/14265
  PCT Pub. Date: May 26, 1995

[30] Foreign Application Priority Data

Nov. 13, 1993 [GB] United Kingdom ............... 9323453

[51] Int. Cl.[7] .................... G06F 11/00; H04L 9/00
[52] U.S. Cl. .......................... 713/202; 711/164
[58] Field of Search ................ 395/186, 187.01, 395/188.01; 380/4, 25, 3; 713/1, 2, 100; 710/200; 707/9; 705/18; 711/164

[56] References Cited

U.S. PATENT DOCUMENTS

| | | |
|---|---|---|
| 4,864,542 | 9/1989 | Oshima et al. .................... 365/189.01 |
| 5,282,247 | 1/1994 | McLean et al. ............................ 380/4 |
| 5,375,243 | 12/1994 | Parzych et al. ......................... 395/725 |
| 5,533,125 | 7/1996 | Bensimon et al. .......................... 380/4 |
| 5,535,409 | 7/1996 | Larvoire et al. ......................... 395/800 |
| 5,551,033 | 8/1996 | Foster et al. ............................ 395/650 |

FOREIGN PATENT DOCUMENTS

| | | |
|---|---|---|
| 0 428 528 B1 | 5/1991 | European Pat. Off. . |
| 0 432 333 | 6/1991 | European Pat. Off. . |
| 90 00771 | 1/1990 | WIPO . |
| 94/11969 | 5/1994 | WIPO . |

OTHER PUBLICATIONS

Electronics International—vol. 55, No. 3, Feb. 1982, New York, US, pp. 121–125.

Maxtor Corporation—product literature—copyright 1993—"PCMCIA Hard Disk Drive Security".

*Primary Examiner*—Robert W. Beausoliel, Jr.
*Assistant Examiner*—Scott T. Baderman
*Attorney, Agent, or Firm*—Alston & Bird LLP

[57] ABSTRACT

A portable hard disk drive has an electrically erasable programmable read-only-memory (EEPROM) for storing a first password for allowing a user access to the disk and a random access memory (RAM) for temporarily storing a password entered by a user. A microprocessor is arranged to compare the user-entered passed with the password stored in the EEPROM and to generate a signal to allow a user access to the disk if a valid match is found and to prohibit access if there is no match.

16 Claims, 4 Drawing Sheets

PASSWORD PROTECTION EXAMPLE

THE USER REQUIRES TO SET THE HARD DISK INTO NO DATA PROTECTION MODE

```
THE USER RUNS A PASSWORD PROTECTION UTILITY PROGRAM
```

```
THE UTILITY PROGRAM DISPLAYS A MENU OF OPTIONS:

N - NO DATA PROTECTION
P - PARTIAL DATA PROTECTION
F - FULL DATA PROTECTION
L - CHANGE LOW-LEVEL PASSWORD
M - CHANGE MASTER-KEY PASSWORD
Q - QUIT
```

```
THE USER SELECTS THE NO DATA PROTECTION OPTION 'N'
```

```
THE UTILITY DISPLAYS:-

NO DATA PROTECTION OPTION SELECTED - ENTER PASSWORD:-
```

```
THE USER ENTERS THE PASSWORD
```

```
THE UTILITY EXECUTES THE NO DATA PROTECTION MODE COMMAND
```

```
THE DRIVE IS NOW IN NO DATA PROTECTION MODE
```

```
THE USER EXITS THE UTILITY BY SELECTING THE QUIT OPTION
```

TTHE OTHER COMMANDS ARE EXECUTED IN A SIMILAR FASHION EXCEPT THAT CHANGING THE PASSWORDS OPTIONS WOULD PROMPT THE USER FOR BOTH THE OLD AND THE NEW PASSWORDS.

*FIG. 4.*

SECURITY SYSTEM FOR HARD DISK DRIVE

The present invention relates to a security system intended for the protection of information recorded on miniature portable hard disk drives for use typically in small portable computers.

The advent of the PCMCIA interface and accompanying plug-compatible memory products means that truly portable mass storage devices will soon become commonplace and easily interchangeable between computer systems and similar devices.

The need for protection of confidential data files is of prime importance in these small disk drives as they can easily be lost or stolen and thus become available to unauthorised users. A method of protection and the protection apparatus must exist in the drive itself to ensure that it is secure wherever it is plugged in and run.

Current methods of file protection such as those included within application software or those using separate utility software packages are not particularly suited to portable devices as they can either be easily decoded by someone skilled in the art or form part of the host system memory.

A first object of the present invention is to provide a method of securing the files on a hard disk drive by means of user password protection.

A second object of the present invention is to provide a system and method of securing the files on a hard disk drive for "read only" operation.

A third object of the present invention is to provide a method of securing the files on a hard disk drive such that "no access" is permitted.

A fourth object of the present invention is to provide a method of providing a Master Key password for authorised secondary access in the event that the user password is lost.

A fifth object of the present invention is to provide a method of protecting the password from discovery by enciphering software programs.

A sixth object of the invention is to provide a system and apparatus to enable the method to be implemented.

In accordance with the present invention there is provided a memory and comparison means with a special utility program to enable the owner or user of a hard disk drive to protect the data files by setting an access password.

According to a first aspect of the present invention there is provided a security system for a portable hard disk drive, said system comprising:

first memory means for storing a password for allowing a user to have access to information on the disk;

second memory means for storing a user-entered password; and comparison means coupled to said first memory means and to said second memory means for comparing the stored password with the user-entered password and for permitting access to information on the disk if the passwords match and preventing access when there is no match.

The password is conveniently stored in flash or other solid state non-volatile memory on the disk drive electronics board and it controls unauthorised access of the drive depending on the level of protection selected. Code used to interact with an utility program which is run on a commuter in which the disk drive is being used in order to provide a reasonably user-friendly interface for entry and/or amendment of passwords, setting of protection mode etc, is also conveniently stored in flash or other solid state memory (which may be the same device as that in which the password is stored), on the disk drive electronics board, so that the main part of the security system is largely contained in the portable disk drive itself. In one possible form of the invention though the utility software may be formed and arranged to read in a computer system identification number (the BIOS Serial No) and use this as a "user input" password to be compared against a stored password so that the drive is "protected" for automatic access only (possibly subject to use of a master password) from a particular computer.

The user may advantageously have the option of setting two or more different levels of security required, such as "no protection", "read only" or "full protection".

In "no protection" mode the drive password defaults to a free access condition. In "read only" mode, files can be read but not altered and new files may not be added to the drive. In "no access" mode the drive will not allow any access.

A Master Password is desirably provided which is stored in a different location in the flash memory. This can only be used by suitable authorised personnel to over-ride any user selected password, for example in the event of a regular password being forgotten. The Master Password could be set during the manufacture of the drive, but more conveniently is set by a purchaser of the disk drive.

The system advantageously has means which prevent the use of special computer programs to decode the password and thereby gain access to the protected files so that if an illegal password is attempted, the drive "hangs" and requires a power-on reset before the password can be re-entered.

Preferably, said first memory means is a non-volatile read-only-memory (ROM). Where a volatile memory is used then the system should of course be provided with power supply means or at least back-up power supply means, though this is generally less convenient. Preferably, said second memory means is a random access memory.

Conveniently, said comparison means is a microprocessor which is formed and arranged to fetch a code corresponding to said stored password from the first memory, fetch a code corresponding to the "user-entered" password, and store the codes in first and second registers, and then compare the contents of the registers and only if there is a valid match, access to the disk drive is permitted. Advantageously the microprocessor is further formed and arranged so that if there is no valid match then the drive "hangs" and requires a power-on reset before a new password is entered.

The first memory (e.g. non-volatile ROM), second memory (e.g. random access memory) and comparison means (e.g. microprocessor) are all conveniently provided in solid state device means on a printed circuit board used for controlling the disk drive (e.g. a PCMCIA Type III hard disk drive).

According to a second aspect of the present invention, there is provided a method of controlling access to a portable hard disk drive comprising the steps of:

storing a first password in a first, usually non-volatile memory;

storing a user-entered password in a second memory;

comparing the first password with the user-entered password; and if a valid match is found, allowing the user access to the disk drive.

Preferably, the method includes the step of allowing the user selectively to access one of a plurality of different protection levels by entering a code corresponding to the protection level together with the password.

Preferably also, the method includes the step of altering the password stored in the non-volatile memory by entering a code corresponding to a password change, together with the existing password stored in said volatile memory and the new password to be stored, so that said new password replaces said existing password.

Conveniently, said codes corresponding to different levels of data protection and said passwords are entered from a keyboard of a computer in which the disk drive has been installed via a software utility run on that computer.

According to another aspect of the present invention, there is provided a circuit board for use with a portable disk drive for controlling access to information on the disk, said circuit board comprising disk drive control means for controlling the rotation of the disk and for writing and reading information to and from the disk, first memory means disposed on said circuit board for storing first password for allowing a user access to the disk, second memory means disposed on the circuit board for storing a password entered by a user, comparison means mounted on the circuit board and coupled to the first and to the second memory means for comparing the stored first password with the user-entered password and for generating an access control signal to allow the user access to the disk if a valid match is found and to prohibit access if there is no match.

These and other aspects of the invention will become apparent from the following description when taken in combination with the accompanying drawings in which:

FIG. 4 is a flowchart of the sequence of operation which takes place when a user requires to set a hard disk into 'No Data Protection Model'.

Figure 1:
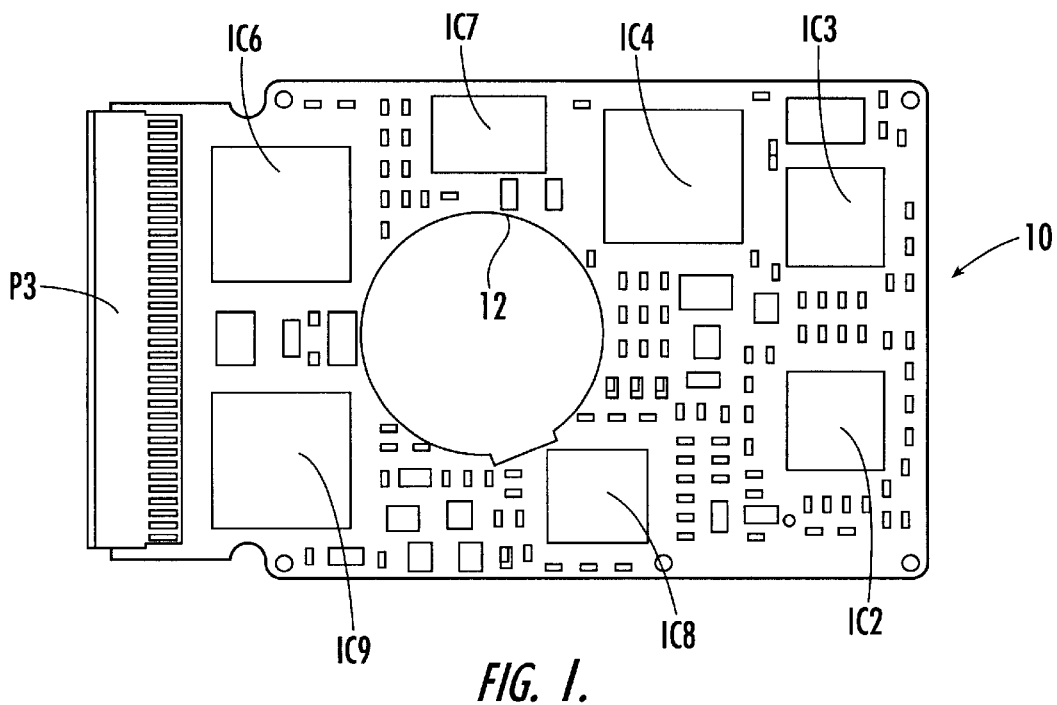
FIGS. 1 and 2 are top and bottom views of a PCB layout for a PCMCIA type III disk drive.
Figure 2:
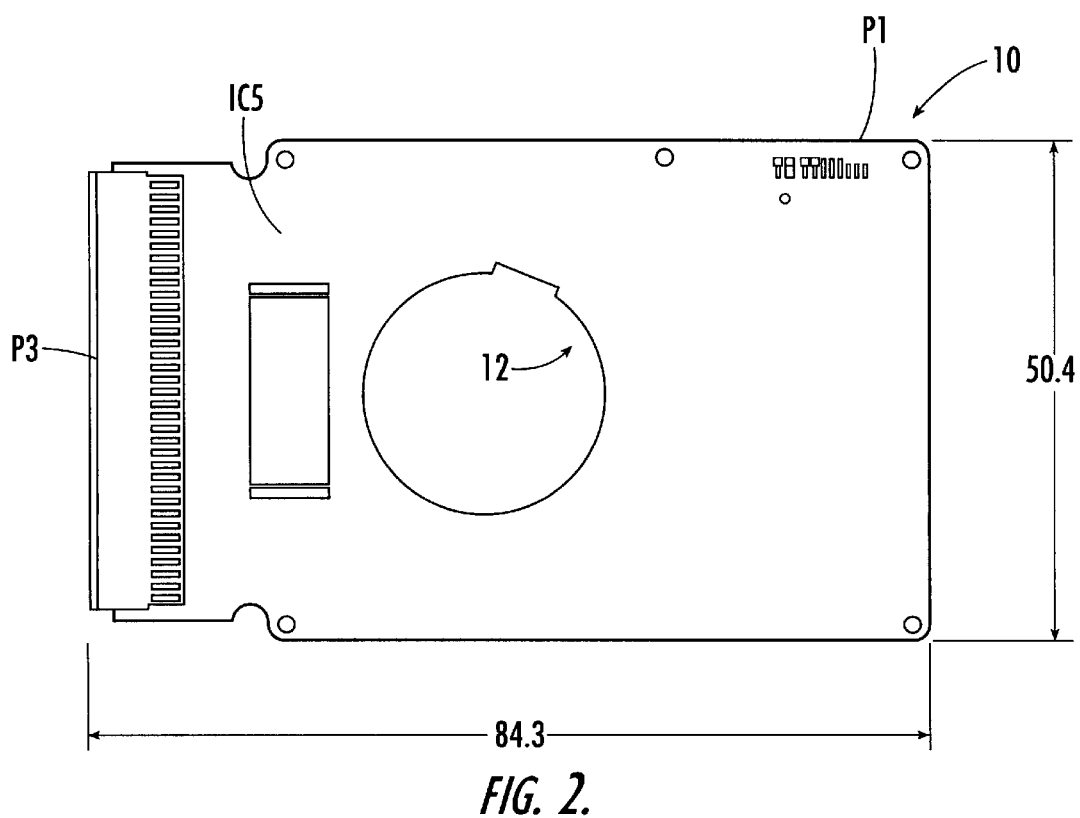

Reference is first made to FIGS. 1 and 2 of the drawings which depict a printed circuit board generally indicated by reference numeral 10 which has a plurality of electronic components (IC2–IC9) thereon, as indicated in FIG. 1, and which has a central aperture 12 for receiving the protruding flange of a spindle motor (not shown in the interests of clarity).

Figure 3:
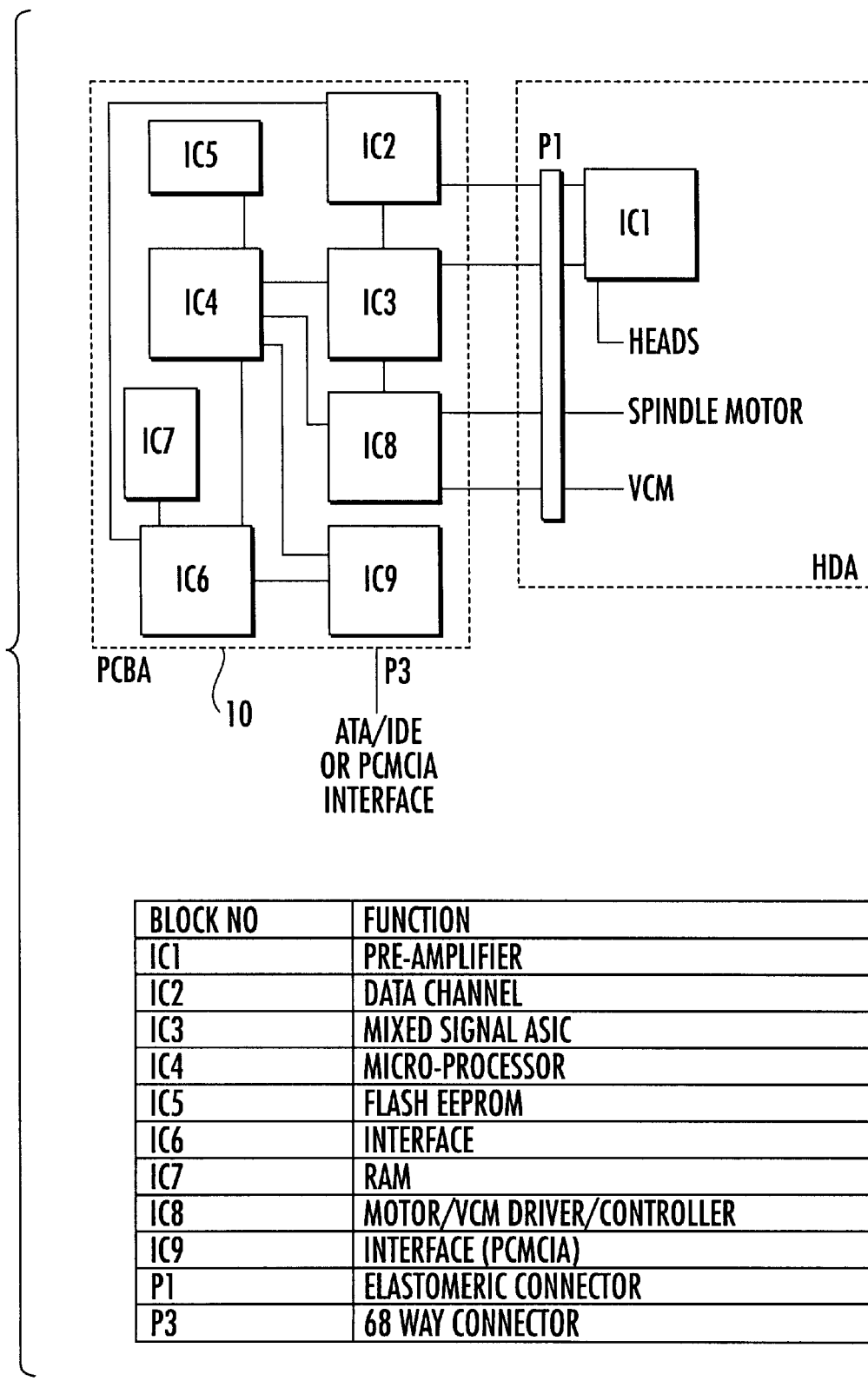
FIG. 3 is a circuit block diagram representing the electronic circuitry shown in FIGS. 1 and 2

The general principles of operation of a PCMCIA disk drive are well known and will not be discussed further, as these are disclosed in applicants' copending U.K. Application No. 9224176.9 and corresponding patent publication No. WO94/11877. As can be seen from FIGS. 1, 2 and 3, IC5 is a non-volatile flash EPROM (e.g. ATMEL AT29C512 (64K bytes) in a 32 pin TSOP package) constituting a first memory means. A user-defined password is stored in IC5. A software utility is run on the computer for setting the password and subsequent entry and/or editing of the password for access to the drive data. The user's password is stored in IC7 STATIC RAM (e.g. Sony CXK5827ATM (32K bytes) in a 28 pin TSOP package).

The code for interacting with the software utility is also stored in the flash EEPROM IC5 and is read into the DSP RAM in the disk drive microprocessor IC4 (preferably a Zilog 286C95 in 100 pin VQFP package) prior to rewriting a new password in the DSP RAM.

As described above there are various levels of data protection which can be implemented with this system. A vendor unique interface command 82h is used to control the data protection mechanism in the drive. This is transparent to the user: it is not menu driven, and software recognises the input code (a to c) to determine the level of protection required. Five different levels of protection are provided as follows:

a) No data protection (write and read access permitted);
b) Partial data protection (read access only permitted);
c) Full data protection (no data access permitted);
d) Low-level password alteration; and
e) Master key password alteration.

It will be appreciated that the passwords are entered from the keyboard of a computer in which the disk drive has been installed, via a menu-driven utility. The low-level and master key passwords each consist of a 127 bytes of data (the 128th byte being conveniently used to set a flag indicating current access mode whereby this can be "remembered" by the system for a subsequent access). The low-level password default is all 'FFh's which serves as the only means of permanently disabling the drive's Data Protection system. Master key Password support is also provided as a means for over-riding the Low-Level Password.

Once a valid Low-Level Password has been set (i.e. at least one of its 127 bytes is non FFh) the drive will default on a subsequent power up to Full Data Protection Mode.

In the preferred embodiment of the invention, as noted above, re-powering up is arranged to restore the protection mode last set. This is particularly useful where for example it is desired to provide read-only access to one or more users who are not password holders to allow such users readily to access data whilst preventing any unauthorized tampering with the data—for example, where portable hard disk drives are used to supply spare part, product and/or pricing data which requires to be updated more or less frequently, to service centres, supermarkets or the like which use computerized files, manufacturers etc.

The particular protection levels are as follows:
a) No Data Protection Mode

This function allows the drive to operate in a mode where both Write and Read operations are permissible. It is executed internally under the control of the microprocessor IC4 via the following sequence:

| | |
|---|---|
| Set the Sector Count Register to | 93h |
| Set the Sector Number Register to | 42h |
| Set the Cylinder Low Register to | 69h |
| Set the Cylinder High Register to | 26h |
| Set the Drive/Head Register to | 00h (No data protection function) |
| Set the Command Register to | 82h (Data protection command)Wait |
| until the Status Register has Busy (Bit 7) = 0 and DRQ (Bit 3) = 1 Password loop: | |

Wait until the Drive/Head Register Bits 0–3=Fh
Set the Sector Count Register with the first (or next) Password byte
Set the Drive/Head Register to 00h
Repeat Password loop until all 127 bytes of the Password have been transferred.

Wait for the Status Register DRQ (Bit3)=0 An Interrupt shall also be generated by the drive upon command completion.

Figure 5:
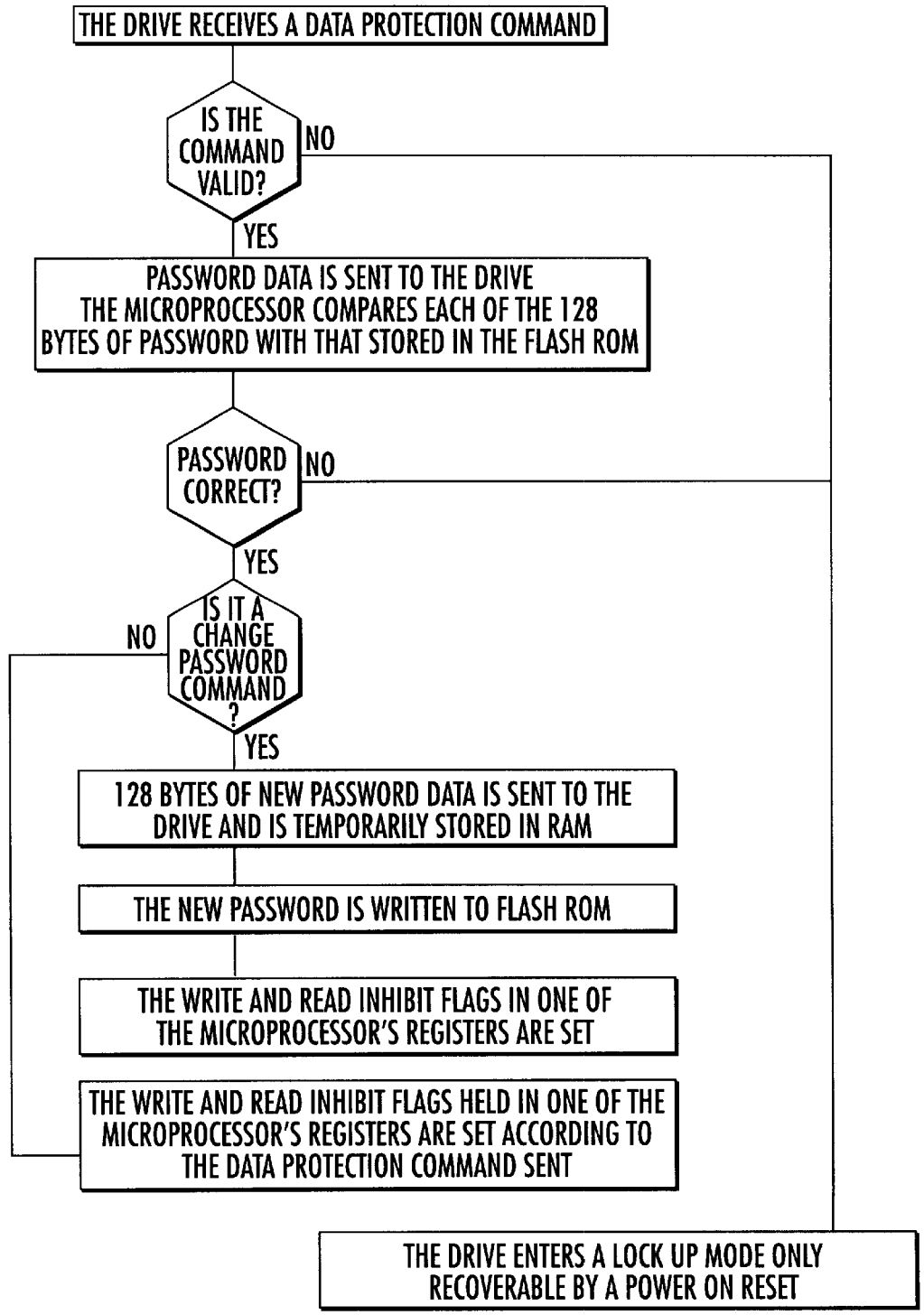
FIG. 5 is a flowchart of the sequence of operations which takes place when the disk drive receives a 'Data Protection Command'.

Read and Write Data access of the drive shall now be permitted. The above is best seen with reference to the flowchart in FIGS. 4 and 5 of the drawings. Similar flowcharts are used for protection levels b) and c) and the flowchart in FIG. 5 is also applicable to password changing as will be described.
b) Partial Data Protection Mode This function is implemented in exactly the same way as that of the No Data Protection Mode with the exception of the Drive/Head Register being set to 01h prior to setting the Command Register.

Once the command is completed, Read Data access only shall be permitted. Attempts at sending write commands shall result in Aborted Command Errors.

c) Full Data Protection Mode

This function is implemented in exactly the same way as that of the No Data Protection Mode with the exception of the Drive/Head Register being set to 02h prior to setting the Command Register.

Once the command is completed, No Data access shall be permitted. Attempts at sending Write or Read commands shall result in Aborted Command Errors.

d) Low-Level Password Alteration

The Low-Level Data Protection Password can be changed by sending the old Low-Level Password along with the new one in the following command sequence:

| | |
|---|---|
| Set the Sector Count Register to | 93 h |
| Set the Sector Number Register to | 42 h |
| Set the Cylinder Low Register to | 69 h |
| Set the Cylinder High Register to | 26 h |
| Set the Drive/Head Register to (Password Alteration Function) | 03 h |
| Set the Command Register to (Data Protection Command) | 82 h |

Wait until the Status Register has Busy (bit 7)=0 and DRQ (bit 3)=1
Password_loop_1:
  Wait until the Drive/Head Register Bits 0-3=Fh
  Set the Sector Count Register with the first (or next) Old Password byte
  Set the Drive/Head Register to 00h
Repeat Password_loop_1 until all 128 bytes of the Old Password have been transferred.
  Wait for the Status Register DRQ (bit 3)=0
Password_loop_2:
  Wait until the Drive/Head Register Bits 0-3=Fh
  Set the Sector Count Register with the first (or next) New Password byte
  Set the Drive/Head Register to 00h
Repeat Password_loop_2 until all 127 bytes of the Old Password have been transferred.
  Wait until the Sector Count Register=01h.
An Interrupt shall also be generated by the drive upon command completion.

e) Master Key Password Alteration

The Master Key Protection Password can be changed by sending the old Master Key Password along with the new one in a sequence identical to that of altering the Low-Level Password with the exception of setting the Drive/Head Register to 04h prior to writing the Command Register.

The setting of a new Master Key Password ordinarily has no effect on the existing Low-Level Password. However, knowledge and unplementatin of the Master Key Password allows a user to change a Low-Level Password. This provides a means for recovering a drive whereby data protection has been invoked but the password has been forgotten. The intention of implementing the Master Key option is for use by restricted personnel only.

Any incorrect attempt at executing a Data Protection Command Function shall result in the drive being disabled where only a power-on reset shall re-enable the interface. This prevents the use of a systematic 'Guess-the-Password-Utility' being used which sends an incrementing password to the drive until it gets it correct.

It will be understood that various modifications may be made to the invention hereinbefore described without departing from the scope of the invention. For example, one or more of the memory chips may be combined with the microprocessor in a single chip instead of separate chips as disclosed in the embodiment. The system is applicable to all sizes of portable hard disk drive, not necessarily PCMCIA type interfaces.

A principal advantage of the invention is that the security system is actually present in the disk drive itself. This means that both the hardware and software is present so that if the disk drive is moved between different machines, the security system will remain in place. A further advantage is that the security system is readily implemented on the disk drive PCB using the existing chip already necessary to control the operation of the disk drive. In addition, the control software is readily loaded into the disk drive circuit.

A further advantage is that various levels of protection can be readily set and passwords can be undated to reflect a variety of changing circumstances.

We claim:

1. A security system for a portable hard disk drive, the system comprising:

first, non-volatile, memory means (IC5) within the disk drive comprising memory for storing a first password;

second memory means (IC7) within the disk drive for transiently storing a second password which may be entered by a user after powering-up of the disk drive in a computer; and comparison means (IC4) coupled to said first memory means and to said second memory means for comparing the stored first password with the second password, characterized in that:

software utility program means is provided externally of the disk drive for running on a computer in which the disk drive is used; and said first, non-volatile, memory means (IC5) within the disk drive also includes memory for storing software code for:

(a) interacting with the software utility program means so as to enable the disk drive to be set by a user, in a chosen one of at least two disk protection modes from which the user may choose, in which the set mode of the disk drive is retained after powering off and re-powering up such that the drive is usable in the same set mode following re-powering up without having to input a password to the drive, said at least two disk protection modes being selected from:

a full data protection mode in which a user is prohibited from reading data from, and writing data to, a disk means of the disk drive, a partial data protection mode in which a user is prohibited from writing data to and is permitted only to read data from the disk means, and a no data protection mode in which a user is permitted to read data from, and write data to, the disk means;

provided that one of said at least two selected disk protection modes is the partial data protection mode; and (b) controlling the disk drive when it has been set in the partial data protection mode so as to allow it to be used for reading only, without said software utility program means and without password entry after powering off and re-powering up, said comparison means (IC4) operating, when the disk drive has been set in one of the full and partial data protection modes and the user enters the second password, to: permit a user to obtain full, namely read and write, access to the disk means, if the passwords match, permit a user to change the protection mode in which the disk drive is set if the passwords match, and prevent a user from obtaining full access to the disk means, and from changing the protection mode in which the disk drive is set, if the passwords do not match.

2. A circuit board (10), for use in a portable hard disk drive for controlling access to information on a disk means of the disk drive, the circuit board comprising disk drive control means for controlling rotation of the disk means and for reading and writing information to and from the disk means; first, non-volatile, memory means (IC5) disposed on the circuit board for storing a first password; second memory means (IC7) disposed on the circuit board for transiently storing a second password which may be entered by a user after powering-up of the disk drive in a computer in which a software utility program means, provided externally of the hard disk, is running; said first, non-volatile, memory means disposed on the circuit board having stored therein software code for:

(a) interacting, in use of the disk drive, with the software utility program means, said interaction between the software code and the software utility program means enabling a user to set the disk drive in a chosen one of at least two disk protection modes from which the user may choose, in which the set mode of the disk drive is retained after powering off and re-powering up such that the drive is usable in the same set protection mode following re-powering up without having to input a password to the drive, said at least two disk protection modes being selected from:

a no data protection mode in which a user is permitted. to write data to, and read data from, the disk means of the disk. drive, a partial data protection mode in which a user is prohibited from writing data to and is permitted only to read data from the disk means, and a full data protection mode in which a user is prohibited from writing data to, and reading data from, the disk means;

provided that one of said at least two selected disk protection modes is the partial data protection mode; and (b) controlling the disk drive, when it has been set in the partial data protection mode, so as to allow it to be used for reading only, without said software utility program means and without password entry after powering off and re-powering up;

and comparison means (IC4) mounted on the circuit board and coupled to the first and second memory means for comparing the first and second passwords and for generating a signal which, when the disk drive has been set in one of the full and partial data protection modes and the user enters the second password: allows a user to obtain full, namely read and write, access to the disk means, if the passwords match, allows a user to change the protection mode in which the disk drive is set if the passwords match, and prevents a user from obtaining full access to the disk means, and from changing the protection mode in which the disk drive is set, if the passwords do not match.

3. A system or a circuit board according to claim 1 or 2, wherein the first memory means is a non-volatile read-only-memory (ROM).

4. A system or circuit board according to claim 3, wherein the read-only-memory is an electrically eraseable programmable read-only-memory (EEPROM).

5. A system or a circuit board according to claim 4, which includes an EEPROM, which EEPROM requires a voltage to both write data to and erase data from the EEPROM, which voltage is in the range from 4.5 to 5.5 volts so that data can be erased from the EEPROM by a microcontroller.

6. A system or a circuit board according to claim 1 or 2, wherein the second memory means is random access memory (RAM).

7. A system or a circuit board according to claim 1 or 2, wherein the comparison means is a microprocessor arranged to fetch a code corresponding to said first password from the first memory means and to fetch a code corresponding to the second password from the second memory means and to store these codes in first and second registers prior to carrying out said comparison.

8. A system or a circuit board according to claim 1 or 2 which includes means for disabling the portable disk drive in the event that the second password does not match the first password so that a power-on reset is required before a new password can be entered by the user.

9. A system or a circuit board according to claim 1 or 2, wherein the first memory means comprises two solid state memory devices, one device being arranged to store said first password and the other device being arranged to store said software code.

10. A system, or a circuit board according to claim 1 or 2, wherein the first memory means is arranged to store a further, master key, password which, if successfully matched by a user-entered password, enables a user to obtain full access to the disk means, thus over-riding said first password.

11. A system or circuit board according to claim 10, wherein said comparison means is arranged to compare said second password with each of said stored first password and further, master key, password and to permit the user to obtain full access to the disk means if the second password matches either one of the stored passwords.

12. A method of controlling access to a portable hard disk drive for use in a computer, comprising the steps of:

storing a first password in a first non-volatile memory means (IC5) located in the disk drive, storing a second user-entered password in a second memory means (IC7) located in the disk drive, and comparing the first and second passwords; characterized by the further steps of:

running a software utility program on the computer; running the software utility program to interact with software code stored in said first non-volatile memory means (IC5) within the disk drive, in order to enable a user to set the disk drive in one of at least two disk protection modes from which the user may choose, in which the set mode of the disk drive is retained after powering off and re-powering up such that the drive is usable in the same set mode following re-powering up without the need to input a password to the drive, said at least two disk protection modes being selected from:

a no data protection mode in which a user is permitted to read data from, and write data to, a disk means of the disk drive, a partial data protection mode in which a user is prohibited from writing data to and is permitted only to read data from the disk means, and a full data protection mode in which a user is denied any access to the disk means;

provided that one of said at least two selected disk protection modes is the partial data protection mode such that once the disk drive is set in the partial data protection mode the disk drive continues to permit read only access without password entry after powering off and re-powering up;

and, when the disk means is set in one of the full and partial data protection modes and the user enters the second password, if a valid match is found upon comparison of the first and second passwords, allowing a user to obtain full, namely read and write, access to the disk means, and to change the protection mode in which the disk drive is set.

13. A method according to claim 12 and including the step of allowing a user access to one of the plurality of powering-up protection modes by entering a code corresponding to the protection mode, together with the password.

14. A method according to claim 12 or claim 13 and including the step of altering the password stored in the non-volatile memory by entering a code corresponding to a password change, together with a password which matches the existing password stored in the non-volatile memory and the new password to be stored, whereby the new password replaces the existing password.

15. A method according to claim 12 or claim 13, further comprising the steps of:

storing a further, master key, password in the non-volatile memory means located in the disk drive; and entering a password which matches the stored, master key, password so as to enable the first password stored in the non-volatile memory means to be changed.

16. A method according to claim 12 or claim 13, further comprising the steps of:

storing a further, master key, password in the non-volatile first memory means located in the disk drive; and altering said further, master key, password by entering a code corresponding to a password change, together with a password which matches the existing master key password stored in the non-volatile memory means and the new master key password to be stored, whereby the new master key password replaces the existing master key password.

* * * * *